No. 713,974. Patented Nov. 18, 1902.
L. T. FOREMAN.
HOSE BRACKET.
(Application filed Oct. 26, 1901.)
(No Model.)
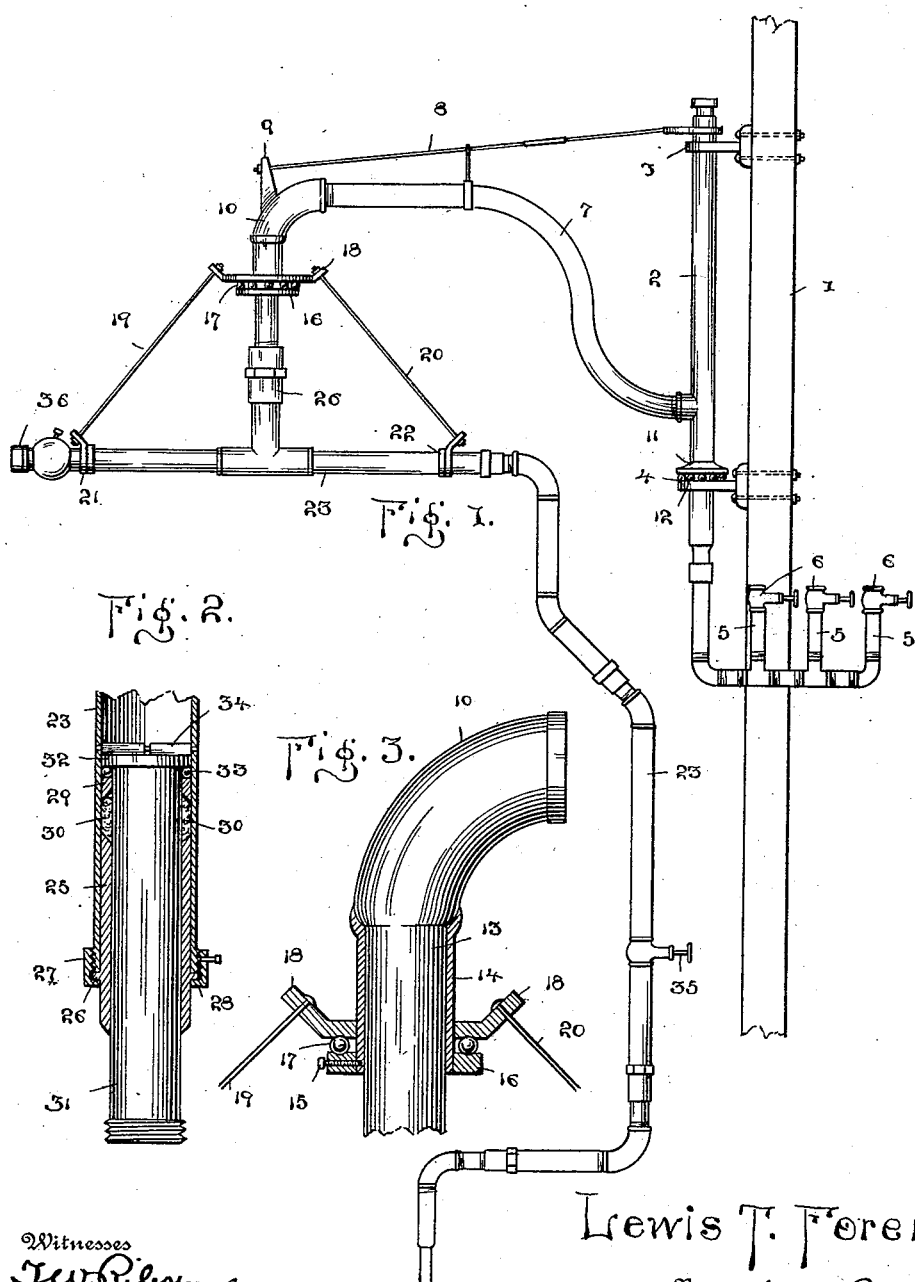
Witnesses
J. W. Riley
A. G. Huffman
Inventor
Lewis T. Foreman,
By Victor J. Evans
Attorney

UNITED STATES PATENT OFFICE.

LEWIS T. FOREMAN, OF OMAHA, NEBRASKA.

HOSE-BRACKET.

SPECIFICATION forming part of Letters Patent No. 713,974, dated November 18, 1902.

Application filed October 26, 1901. Serial No. 80,104. (No model.)

*To all whom it may concern:*

Be it known that I, LEWIS T. FOREMAN, a citizen of the United States, residing at Omaha, in the county of Douglas and State of Nebraska, have invented certain new and useful Improvements in Hose-Brackets; and I do hereby declare the following to be a full, clear, and exact description of the invention, such as will enable others skilled in the art to which it appertains to make and use the same.

This invention relates to swinging hose-brackets; and the primary object thereof is to provide a bracket for supporting hose whereby the same may be supported by universal joint, so that the discharge end of the hose may be conveniently carried in any part of the establishment in which the bracket is installed.

A further object of the invention is to devise a cheap, durable, and efficient means for supporting pipe and hose whereby liquids, air, or steam may be conveyed in oil-works, smelters, breweries, packing-houses, railroad-roundhouses, or, in fact, in any convenient place in which this device may be utilized.

A further object is to provide a bracket whereby a saving of extra pipes, fittings, and valves will be effected.

A still further object is to provide a bracket adapted to be secured to a battery of boilers and so that one valve will be accessible at all times to take the place of many valves, making it capable of saving a fitting up of a battery of boilers and doing away with perishable material, such as steam-hose and other accessories to be found in an ordinary boiler-room.

Further objects, as well as the novel details of construction, will be clearly described hereinafter and illustrated in the accompanying drawings and the novel construction recited in the appended claims.

In the drawings, Figure 1 is a side elevation of a section of hose and a bracket arranged in accordance with my invention. Fig. 2 is a vertical longitudinal sectional view through one of the universal joints, and Fig. 3 is a similar view of the supporting-table.

The reference-numeral 1 designates the front of a boiler or other support, to which is secured a stand-pipe 2 by suitable brackets 3 and 4. The lower end of the pipe 2 is provided with a plurality of supply-pipes 5, each having valves 6 therein and arranged so as to communicate with a source of supply, either water, steam, or any other liquid. Intermediate the ends of the vertical stand-pipe 2 is a branch pipe 7, which is curved upwardly and laterally from the pipe 2 and supported thereon by an adjustable brace-rod 8, which is connected to the top of the pipe 2 and to an upwardly-projecting extension 9 on the end of an elbow 10 of the branch pipe 7.

The rod 8 is adjusted with relation to the branch pipe 7 by means of an adjusting-nut 8' on the end of said rod and which bears against the extension 9 in the end of the elbow 10.

It will be understood that the pipe 2 is pivotally secured in the brackets and is supported mainly on the bracket 4 by means of a flange 11, which is secured to the pipe and which rests on the antifriction-bearings 12.

The elbow 10 is reduced to form a downwardly-projecting extension 13 and is provided with a sleeve 14, encircling the same and bearing against the shoulder of said elbow, being secured to the extension by a set-screw 15, which also fastens an angular collar 16 to said sleeve, in which is formed a raceway carrying a plurality of antifriction-balls 17.

Mounted on the sleeve 14 is a turn-table 18, which is supported by truss-rods 19 and 20, secured to a flared flange projecting from the outer edge of the turn-table and to rings 21 and 22 on the supply discharge-pipe 23, connected to said extension 13 by the union 24. Inasmuch as the union 24 loosely connects the extension 13 and the pipe 37 said pipe 37 can be turned through the medium of the turn-table and braces 19 and 20.

The remaining portion of the pipe or hose is connected by joints or unions of novel construction, which is clearly illustrated in Fig. 2. In this figure, 23 designates one end of one of the sections of the discharge-pipe, in which is mounted a sleeve 25, having an angular rib 26 intermediate its ends, which overlaps the edge of the pipe 23, on which is threaded a collar 27, provided with an inwardly-projecting flange 28, which is adapted to force the rib against the edge of the pipe 23, and thereby hold the sleeve 25 in position.

A ring 29 is mounted above the sleeve 25 and has its adjacent edge chamfered or beveled, as is the edge of the sleeve 25 opposite thereto. Between the two edges is arranged packing 30 of any desired material, the purpose of which will be hereinafter apparent.

The pipe 31 is loosely mounted in the sleeve 25 and is provided at its upper end with an angular flange 32, which fits snug against the inner surface of the pipe 23 and is supported above the ring 29 by antifriction-bearings 33. The upward movement of this pipe is regulated by transversely-arranged pins 34, which bear against the same, thus holding the ring 29 and packing in place. Should any steam or other fluid pass the flange 32, the ring 29 and packing 30 form such a tight joint that it will be impossible for the coupling or union to leak. Inasmuch as the stand-pipe, which carries all the operating mechanism, may be swung from right to left on the bracket 4, a complete rotation of the discharge-pipe 23 may be made on the turn-table 18. It will be obvious that the discharge-nozzle may be conveyed to any part of the building in which the apparatus is installed in a convenient manner.

The unions illustrated in Fig. 2 make it possible for the pipe to assume almost any position, so that said pipe or hose may be conveniently manipulated for filling vats or for other purposes.

Of course it will be understood that there will be a plurality of these unions between the respective ends of the supply-pipe 23, as many being used as will be found convenient. At any convenient part in the discharge-pipe I provide a shut-off valve 35, the purpose of which will be obvious.

While I have shown but a single line of hose leading from the pipe 23, it will be obvious that a similar line may be run from the opposite end (designated by the reference-numeral 36) if it will be found convenient.

It will be noticed that the entire support is carried by the steam or pipe supply bracket and that the branch pipe may be conveniently swung to any part of the building in which the bracket is installed.

While I have specifically described what to me at this time appears to be the very best means of accomplishing the desired result, I would have it understood that I do not limit myself to the exact construction shown, but reserve the right to make such slight changes and alterations as suggest themselves from time to time without departing from the spirit of this invention.

Having thus described my invention, what I claim as new, and desire to secure by Letters Patent, is—

In a hose-bracket, the combination with a support, of a vertical pipe carried thereby and adapted to be rotated thereon, a branch pipe leading from the vertical pipe and supported thereby, said branch pipe having a restricted depending end whereby a shoulder is formed at the juncture of the same with the branch pipe, a tube fitting over the restricted end and having a flared portion snugly engaging the shoulder, a collar removably secured to the lower end of said tube, a discharge-pipe revolubly connected to the restricted end of the branch pipe, a turn-table disk revolubly mounted on the collar and fitting over the restricted end of the branch pipe and connections secured to the turn-table disk and the discharge-pipe.

In testimony whereof I affix my signature in presence of two witnesses.

LEWIS T. FOREMAN.

Witnesses:
 MARGARET REED,
 SARAH McCARTY.